Figure 5:
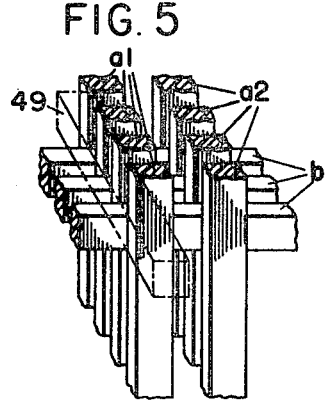

United States Patent

[11] 3,620,374

| [72] | Inventor | Robert J. Brinkema<br>Rochester, Mass. |
|---|---|---|
| [21] | Appl. No. | 674,375 |
| [22] | Filed | Sept. 14, 1967 |
| [45] | Patented | Nov. 16, 1971 |
| [73] | Assignee | Joseph T. Kyerson & Son, Inc.<br>Original application May 23, 1966, Ser. No. 552,228, which is a continuation-in-part of application Ser. No. 282,808, May 23, 1963, now abandoned. Divided and this application Sept. 14, 1967, Ser. No. 674,375 |

[54] REINFORCED PLASTIC FILTER PLATE STRUCTURE
5 Claims, 5 Drawing Figs.

| [52] | U.S. Cl. | 210/231 |
|---|---|---|
| [51] | Int. Cl. | B01d 25/12 |
| [50] | Field of Search | 210/228, 231, 486, 224, 226, 227 |

[56] References Cited

UNITED STATES PATENTS

| 702,051 | 6/1902 | Enzinger | 210/231 |
|---|---|---|---|
| 2,594,518 | 4/1952 | Teale | 210/231 |
| 2,786,793 | 3/1957 | Shobert | 154/91 |
| 3,018,894 | 1/1962 | Brown | 210/231 |
| 3,019,905 | 2/1962 | Baker et al. | 210/486 |
| 3,046,180 | 7/1962 | Diehl et al. | 156/246 |
| 3,241,678 | 3/1966 | Wrotnowski | 210/228 X |
| 3,295,687 | 1/1967 | Schmerler | 210/486 |
| 3,251,470 | 5/1966 | Meyer | 210/500 X |

FOREIGN PATENTS

| 635,962 | | France | 210/231 |
|---|---|---|---|
| 642,884 | | France | 210/231 |
| 1,027,343 | | France | 210/231 |
| 67,546 | 8/1948 | Denmark | 210/224 |

*Primary Examiner*—J. L. DeCesare
*Attorney*—Hibben, Noyes and Bicknell

ABSTRACT: An open rigid fiber glass reinforced laminated filter plate structure having reinforced members with intersections therebetween to provide supporting pillars.

PATENTED NOV 16 1971 3,620,374
SHEET 1 OF 2
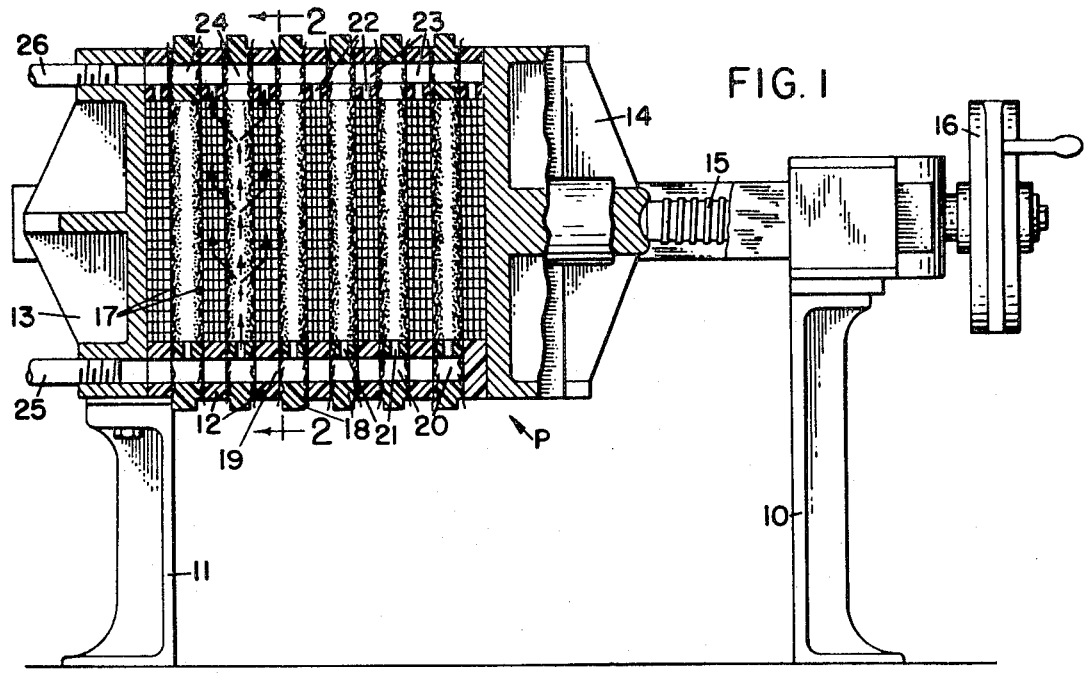
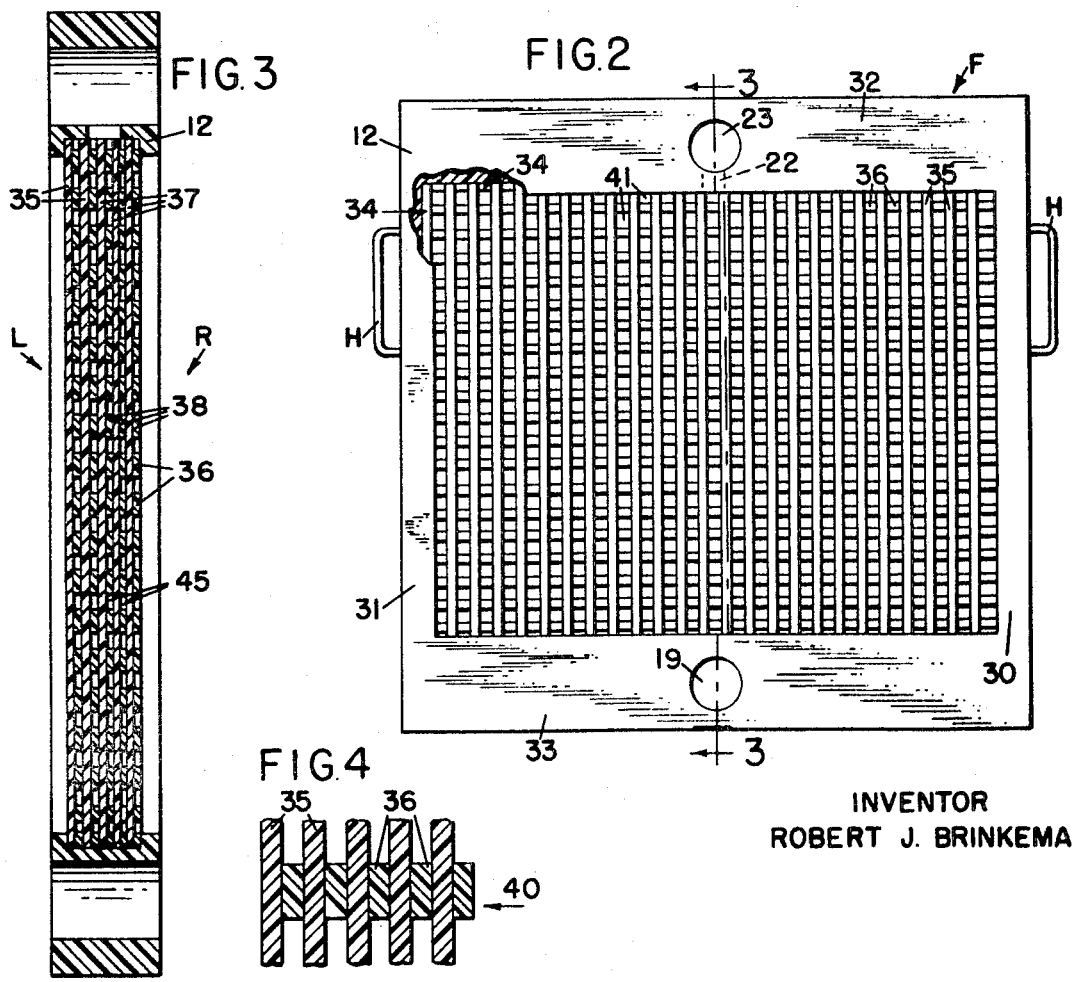
INVENTOR
ROBERT J. BRINKEMA

REINFORCED PLASTIC FILTER PLATE STRUCTURE

This application is a division of Ser. No. 552,228, filed May 23, 1966, which in turn is a continuation-in-part of Ser. No. 282,808, filed May 23, 1963, now abandoned.

This invention relates to improvements in plastic structures of the kind which are useful as grates, screens, filter leaves or plates, etc.

It has been customary in the past to make such structures of perforated rigid sheets through which water or a filtrate could pass. With more particular reference to filters such structures have been formed with a plurality of spaced pyramids or comes supporting a filter cloth to prevent it from interfering with the flow of a filtrate.

It is an important object of the invention to make an open plastic structure of comparatively thin rods or elements reinforced with mineral filaments, such as glass, embedded in plastic resinous material, and lay the rods up in successive layers and in such order as to provide passages for fluid material which will not be blocked by walls provided by the rods if the latter were laid up in some other order.

The rods or elements in each plane or layer are preferably though not necessarily, parallel to each other and equally spaced while the rods of an adjacent plane or layer are similarly disposed but transverse relative to the rods of the first layer, being for instance, at right angles.

The invention will be described in more detail as related to a filter plate which will include a rigid frame built around the plastic structure, but it is to be understood that certain features are equally usable in filter leaves. In a filter plate, it is desirable to provide numerous passageways for movement of the filtrate which passes through the filter cloth, and at the same time form the plate so that it can withstand high filter pressures. To accomplish these results it is another object to arrange the rod elements so that they cross each other in such manner as to form solid structures at their points of crossing, these structures being disposed at right angles to the plane of the plate to provide maximum strength to resist compression or bending under pressure and being spaced apart to leave passages all around them for a filtrate.

The invention set forth hereinafter employs materials and method steps not mentioned in the original case of which this is a continuation-in-part. For instance, the catalyst used herein has the effect of retarding the setting of the resin so that the latter will remain wet and not harden before the final pressing operation. In this way the first roving laid out would not harden prematurely.

Also, some of the specimens made according to the previous application proved to be too brittle for practical use. The new materials mentioned hereinafter cured the defect of brittleness.

Furthermore, it has been found desirable to maintain the roving under considerable tension as it is drawn out preparatory to being laid on a flat surface. It is a further object of the invention to provide an open plastic structure which can be used as a grate in position where it can support the weight of one or more persons, or can be enclosed in a frame and serve as a filter.

These and other features of the invention will appear as the description proceeds in connection with the accompanying drawing which shows a convenient form of the invention and in which:

FIG. 1 is an elevation partly in section of a filter press having several filter plates in place, the press features being of common form, FIG. 2 is an enlarged face or front view of a filter plate as seen looking in the direction of arrows 2—2, FIG. 1, FIG. 3 is an enlarged section of line 3—3, FIG. 2, FIG. 4 is a detail showing a structure made by the crossing of two groups of elements transverse to each other, and FIG. 5 is a detail perspective view of one of the supporting structures with adjacent rods removed.

Referring to FIG. 1, a filter press P having legs 10 and 11 supports a plurality of filter plates 12 between a fixed head 13 at the left and an adjustable head 14 at the right which can be moved into clamping position by means of a screw 15 and handwheel 16. FIG. 1 shows filter cloths 17 held in place between plates 12 and frames 18 which alternate with the plates. The frames have a common inlet duct 20 which communicates with passages 21, one for each frame, through which passes the incoming slurry or material to be filtered. The filter plates are each made with a hole 19 communicating with duct 20 for passage of the slurry, and the upper ends of the plates 12 have outlet passages 22 communicating with holes 23 forming part of a common filtrate outlet duct 24 leading to a pipe 26 which delivers the filtrates to a receiver (not shown). The inlet pipe 25 is similarly understood to connect with a source (not shown) of slurry material to be filtered. It is to be understood that pipes 25 and 26 have appropriate fluid communication with passages 21 and 22 respectively. Any other desired means may be used to introduce slurry into the press and withdraw the filtrate from it.

Referring more particularly to FIGS. 2 and 3 which show a filter plate 12, the latter has a frame F comprising side members 30 and 31 and top and bottom end members 32 and 33. These members are preferably made of a plastic material such as a polyester and have their ends secured to each other in any approved manner and are provided each with a lengthwise groove 34 which opens inwardly toward the center of the filter plate. The plate 12 may be considered to have opposite faces, such as right and left faces R and L, respectively, see FIG. 3.

The side and end members have secured to them a plurality of rods or elements which are arranged in several different planes as suggested in FIG. 3. As shown in FIG. 2, two sets of elements are visible, the vertical primary elements 35 being parallel to the side members of the frame and the horizontal secondary elements 36 extending parallel to the end members. The elements 35 extend across the frame from one end member to the other and into the slots 34 of the end members, and the elements 36 extend across the frame from one side member to the other and extend into the slots 34 of the side members. The elements 35 and 36 are arranged in planes parallel to the plane of the plate 12, elements 35 in alternate planes and elements 36 in the intermediate planes.

The elements 35 and 36 are preferably made of a resin which can be readily integrated with the side and end members, such for instance, as polyester, the rods extending into their respective slots 34 sufficiently to be integrated or cemented in any approved manner with respect to the members of the framework. The side members have handles H to facilitate their manipulation. It is to be understood that there are several layers of elements 35, adjacent elements being aligned in groups arranged at right angles to the plane of the plate. Elements 36 are similarly arranged but at right angles to elements 35. The group of elements 35 are designated at 37 and groups of elements 36 at 38. The groups 37 may be considered primary and groups 38 secondary.

It will be understood that the groups 37 and 38 cross each other in numerous places and at each point of crossing the elements of one group, as 37, contact the elements of another group, as 38, as shown in FIG. 4. The elements 36 alternate with the elements 35 and each crossing presents a solid plastic structure 49 extending from face to face of the plate. Each structure is very effective in resisting high compressive forces exerted against the faces of the filter plate during the filtering operation. The structure shown in FIG. 4 is duplicated a great many times throughout the structure of the plate with the result that the plate has uniform strength throughout its area.

FIG. 5 shows part of one of the plastic structures 49 with many parts, vertical and horizontal, removed to show the amount of free room around a structure 49 for circulation of a filtrate.

In FIG. 5 two sets of vertical rods or bars are shown at $a^1$–$a^2$ and one set of horizontal bars b. The dot and dash lined enclosure may be considered to be a structure 49. From this figure, it can be seen that the filtrate can flow for the full height of bars $a^1$–$a^2$ on both the narrow sides of them, and flow similarly along the narrow tops and bottoms of bars b.

By referring to FIG. 3, it will be understood that even though high pressures should deflect parts of the filter cloths into the meshes 41, the cloth cannot be deflected inwardly far enough to block off all the numerous paths for the filtrate unless the pressure is enough to perforate the cloth to the point of making it useless. There will always be some path open for outflow of the filtrate. This condition will exist even though only four layers of elements are used, two arranged at the right face R and two at the left face L. In such a case the cloths might be pressed firmly against the inner elements of the pairs of elements, as for instance elements 36 as viewed in FIG. 2 and part way into the meshes 41 but not sufficiently to block the passages 45 which are arranged throughout the plate between said pairs of layers already mentioned. The groups are preferably spaced apart a distance equal to the width of the elements. As an example, not however to limit the scope of the invention, the elements may be one-fourth inch wide and the groups, as 37, be one-fourth inch apart.

The filter grid shown herein is formed by impregnating thick bundles of continuous fiberglass strands with a liquid thermosetting resin. The continuous thick bundle or wetted roving is laid back and forth on a platen in a layer on given centers and firmly supported at the end of each pass to provide tension and uniform spacing of the roving. After a determined number of passes have been made in one direction, a second layer of continuous wet roving is applied on top of the first layer but at right angles to it. It is uniformly spaced and held under tension like the first layer. A third layer of roving is applied under same conditions on top of the second but parallel to the first layer. More layers are applied with continuous strands, each layer applied at right angles to the preceding layer until the buildup is to the desired thickness.

Uniform pressure is applied by a platen on top of the last layer to bring all of the roving bundles in contact with each other. Stops are used between top and bottom platen so the contact is controlled and not over compressed.

The liquid resin hardens so each bundle becomes a stiff rod and bonded together at each point of crossing contact. The resin on hardening shrinks and pulls the continuous fiberglass strands very tight, putting them under great strain (stress) so that when the resin finally hardens, it holds the glass fibers under great stress forming a composition like prestressed steel and concrete.

The continuous fiberglass strands are wetted in a resin bath of polyester resin. Excess resin is removed when the fiber bundles are pulled through an orifice at the end of the bath before forming the grid.

A good corrosion resistant polyester resin generally contains a high percent of monomeric styrene. This produces a very thin liquid resin of quite low viscosity. It is necessary to increase the viscosity of the resin to control the percent of resin to roving and prevent draining. This is done with a small percent of microscopic particles of silica dioxide (Cabosil) a thixotropic agent. It is most important that the hardening of the resin in all layers takes place at the same time after pressure has been applied. If there is a prehardening of the first layers there will not be a good bond between the lower crossing bundles and excess openings will appear between them. At the same time the top layers will receive an excess amount of flattening closing up desired area between the bundles.

This controlled hardening (polymerization) is done by a proper balance of accelerator and catalyst. The catalyst overcomes an inhibitor in the basic resin and starts the chain reaction of polymerization or molecular cross linkage. The accelerator reacting with the catalyst determines the speed the catalyst will react with the resin.

In formulating the resins for the grid Atlac 382-13 is used as the base resin, Magnesium Napthanate as the accelerator and Cumene Hydro Peroxide is the catalyst. With these materials, the previously mentioned hardening of the first layers is delayed.

The fiberglass bundles are formed of 60 end rovings of Owen-Corning "C" glass. This is a new form of chemical resistant fiberglass strands. Four 60 end rovings make up the bundle cross section. If two end rovings were used, the cross sectional area would be small at the cross over points of the bundles and a small amount of pressure would make a solid structure at cross over and in between. This is the way fencing is made.

Three 60 end roving with proper pressure will produce a structure like grating. Four 60 ends or more will make the open structure of the grid with properly controlled pressure. It is understood the fiberglass bundles must be held under continuous tension until the whole structure has hardened.

Having now particularly described and ascertained the nature of the invention and in what manner the same is to be performed, what is claimed is:

I claim:
1. A filter plate for use in a filter press, comprising;
   a. a frame having side and end members, one of which has an inlet for material to be filtered and another of which has an outlet for filtrate; and having at least three layers of spaced apart elongated rigid reinforced resin elements extending between said members lying in spaced planes parallel to the plane of said frame;
   b. a first layer of said elements extending in a first direction and connecting two said members of said frame;
   c. a second layer of said elements extending in a second direction connecting two other said members of said frame to contact and cross elements of said first layer; and
   d. a third layer of said elements connecting two said members and extending in a direction to contact and cross the elements of said second layer at the crossing points between the elements of said first and second layers and spaced apart from said first layer;
   e. each of said elongated rigid reinforced resin elements having the end portions thereof secured to members of said frame and each having a diameter less than the thickness of the said frame;
   f. means to secure said elements of said layers to elements of adjacent layers only at their crossing points to provide a plurality of uniformly spaced supporting structures which extend from said first layer to said third layer at said crossing points; and
   g. said elements being so constructed and arranged in said layers to provide a plurality of unobstructed passages extending between said members of said frame in at least said first and said second directions lying in spaced planes parallel to the plane of said frame and a plurality of other unobstructed passages extending through said frame perpendicular to the plane of said frame and intersecting each of said unobstructed passages extending between said frame members.

2. The filter plate as set forth in claim 1 wherein the elements in at least one of said layer comprise a thermosetting resin.

3. The filter plate as set forth in claim 2 wherein said elements are reinforced with glass fiber.

4. The filter plate as set forth in claim 1 wherein the elements of said first layer extend in the same direction as do the elements in said third layer.

5. The filter plate as set forth in claim 1 wherein said elements are secured at their contact points by bonding.

* * * * *

PO-1050
(5/69)

UNITED STATES PATENT OFFICE
CERTIFICATE OF CORRECTION

Patent No. 3,620,374            Dated November 16, 1971

Inventor(s) ROBERT J. BRINKEMA

It is certified that error appears in the above-identified patent and that said Letters Patent are hereby corrected as shown below:

Title page, in Item "73", line 1, "Joseph T. Kyerson & Son, Inc." should read --Joseph T. Ryerson & Son, Inc.--; Col. 1, line 4, "now abandoned." should read --both now abandoned--; Col. 1, line 12, "comes" should read --cones--.

Signed and sealed this 6th day of June 1972.

(SEAL)
Attest:

EDWARD M. FLETCHER, JR.
Attesting Officer

ROBERT GOTTSCHALK
Commissioner of Patents